United States Patent
Mösl et al.

(10) Patent No.: US 11,198,347 B2
(45) Date of Patent: Dec. 14, 2021

(54) EVAPORATOR UNIT FOR A FUEL-OPERATED VEHICLE HEATER

(71) Applicant: Webasto SE, Stockdorf (DE)

(72) Inventors: Klaus Mösl, Stockdorf (DE); Bengt Meier, Stockdorf (DE); Vitali Dell, Stockdorf (DE); Jan Steffens, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/954,711

(22) PCT Filed: Oct. 23, 2018

(86) PCT No.: PCT/EP2018/079013
§ 371 (c)(1),
(2) Date: Jun. 17, 2020

(87) PCT Pub. No.: WO2019/120692
PCT Pub. Date: Jun. 27, 2019

(65) Prior Publication Data
US 2020/0384832 A1      Dec. 10, 2020

(30) Foreign Application Priority Data
Dec. 22, 2017   (DE) ..................... 10 2017 131 181.5

(51) Int. Cl.
*B60H 1/22*       (2006.01)
*F23D 11/00*      (2006.01)
(Continued)

(52) U.S. Cl.
CPC ......... *B60H 1/2209* (2013.01); *B60H 1/2203* (2013.01); *B60H 1/2212* (2013.01);
(Continued)

(58) Field of Classification Search
CPC ... F23D 3/40; F23D 5/123; F23D 5/04; F23D 5/045; F23D 11/383; F23D 11/441;
(Continued)

(56) References Cited

U.S. PATENT DOCUMENTS 9,857,081 B2 *   1/2018   Collmer  ............... B60H 1/2212
9,863,640 B2 *   1/2018   Pfister  .................. B60H 1/2203
(Continued)

FOREIGN PATENT DOCUMENTS

CN   102200279 A  *   9/2011  ............. F23D 5/123
CN   104566360 A  *   4/2015  ........... B60H 1/2212
(Continued)

OTHER PUBLICATIONS

International Searching Authority. International Search Report and Written Opinion for application PCT/EP2018/079013, dated Jan. 15, 2019.

*Primary Examiner* — Steven B McAllister
*Assistant Examiner* — Daniel E. Namay
(74) *Attorney, Agent, or Firm* — Quarles & Brady LLP

(57) ABSTRACT

An evaporator assembly (10), in particular for a fuel-operated vehicle heater (12), comprising a pot-like evaporator reception (14), an evaporator body (16) inserted into the pot-like evaporator reception (14), a plate-like designed hold-down element (18), which is fixed to the evaporator reception (14) and fixes the evaporator body (16) in the evaporator reception (14), and wherein the plate-like designed hold-down element (18) has at least one retaining claw (22), which has an upper part (26) on an upper side (24) of the plate-like designed hold-down element (18) and a lower part (30) on a lower side (28) of the plate-like designed hold-down element (18), wherein the upper part (26) and the lower part (30) point away from the plate-like designed hold-down element (18).

6 Claims, 8 Drawing Sheets

Figure 1:
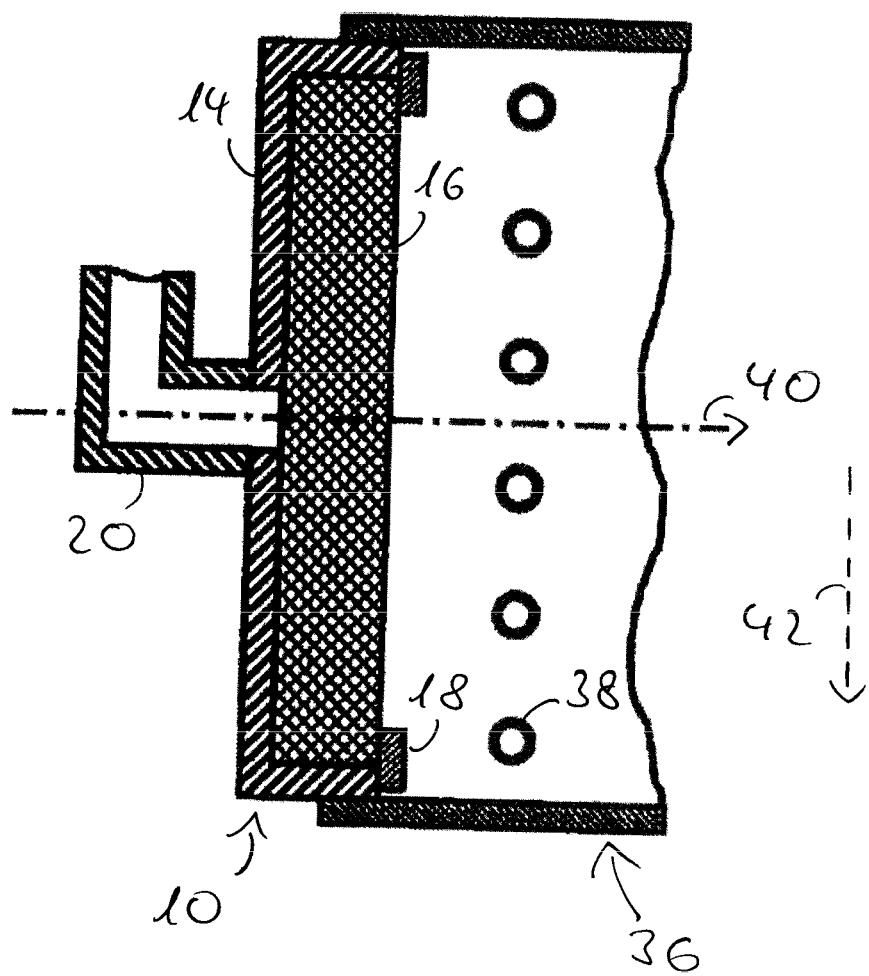

(51) Int. Cl.
*F23D 5/04* (2006.01)
*F23D 11/44* (2006.01)
*F23D 3/40* (2006.01)

(52) U.S. Cl.
CPC ............... *F23D 3/40* (2013.01); *F23D 5/04* (2013.01); *F23D 11/00* (2013.01); *F23D 11/441* (2013.01); *B60H 2001/2281* (2013.01); *B60H 2001/2284* (2013.01); *F23D 2900/21002* (2013.01)

(58) Field of Classification Search
CPC ........... F23D 11/00; F23D 2900/21002; F23D 2900/05002; F23D 2207/00; F23D 2202/00; F23D 11/44; F23D 11/46; B60H 1/2203; B60H 1/2212; B60H 1/2209; B60H 1/032; B60H 2001/2284; B60H 2001/2281; F23C 7/008; F23C 2700/026; F24C 5/02; F24C 5/10; F23K 5/22
USPC ........................................ 431/7, 170; 237/32
See application file for complete search history.

(56) References Cited

U.S. PATENT DOCUMENTS

| | | | |
|---|---|---|---|
| 2008/0134580 A1* | 6/2008 | Kah | F23D 3/40 48/197 FM |
| 2015/0102115 A1* | 4/2015 | Collmer | B60H 1/2212 237/12.3 C |
| 2015/0102116 A1* | 4/2015 | Pfister | F23D 11/448 237/12.3 C |
| 2015/0102117 A1* | 4/2015 | Collmer | F23D 11/406 237/12.3 C |
| 2018/0066841 A1* | 3/2018 | Blaschke | F23D 3/40 |
| 2018/0202651 A1* | 7/2018 | Moesl | F23D 3/40 |

FOREIGN PATENT DOCUMENTS

| | | | | |
|---|---|---|---|---|
| DE | 3914611 A1 | * | 12/1989 | ............... F24C 5/14 |
| DE | 4401799 C1 | * | 6/1995 | ............ F23D 11/441 |
| DE | 10252888 A1 | | 1/2004 | |
| DE | 102005004359 A1 | * | 8/2006 | ............ F23D 11/448 |
| DE | 102005032980 A1 | * | 1/2007 | ............... F23D 3/40 |
| DE | 102012111289 B3 | | 3/2014 | |
| DE | 102016108041 B3 | | 11/2017 | |
| DE | 102016116687 A1 | * | 3/2018 | ............... F23D 3/40 |
| EP | 1744100 A2 | * | 1/2007 | ............... F23D 3/40 |
| EP | 2538135 A2 | | 12/2012 | |
| RU | 2310128 C1 | * | 11/2007 | ............... F23D 3/40 |
| RU | 2578779 C1 | * | 3/2016 | ............ F24H 9/1881 |
| RU | 2580751 C1 | * | 4/2016 | ............... F24C 5/02 |

* cited by examiner

EVAPORATOR UNIT FOR A FUEL-OPERATED VEHICLE HEATER

This application represents the national stage entry of PCT International Application No. PCT/EP2018/079013 filed Oct. 23, 2018, which claims priority to German patent application DE 10 2017 131 181.5 filed Dec. 22, 2017. Each of these applications is hereby incorporated herein by reference for all purposes.

An evaporator assembly is described, in particular for a fuel-operated vehicle heater.

Fuel-operated vehicle heaters often comprise an evaporator assembly in which a combustible fuel-air mixture is produced from liquid fuel and air, whereby the initially liquid fuel is vaporized. The quality of the produced fuel-air mixture contributes significantly to the compliance with increasingly strict exhaust gas regulations. At the same time, it goes without saying that the design of the evaporator assembly should be as simple as possible in order to provide a reliable evaporator assembly that can be manufactured cost-effectively.

Described is an evaporator assembly, in particular for a fuel-operated vehicle heater, comprising a pot-like evaporator reception, an evaporator body inserted into the pot-like evaporator reception, a plate-like designed hold-down-element, which is fixed to the evaporator reception and fixes the evaporator body in the evaporator reception, and wherein the plate-like designed hold-down element has at least one retaining claw, which has an upper part on an upper side of the plate-like designed hold down element and a lower part on a lower side of the plate-like designed hold-down element, wherein the upper part and the lower part point away from the plate-like designed hold-down element. The at least one retaining claw is thus designed in such a way that it has an upper part on the upper side of the plate-like designed hold-down element which projects in a raised manner beyond the upper side and has a lower part on the lower side which projects in a raised manner beyond the lower side. In this way, a reliable and accurately positioned fixing of the evaporator body can be guaranteed, regardless of whether the upper side of the plate-like designed hold-down element or the lower side of the plate-like designed hold-down element points towards the inserted evaporator body during assembly. An accidental "wrong" assembly of the hold-down element, for example by mixing up the upper and lower sides, has no adverse effects. The at least one retaining claw can prevent the evaporator from slipping or wandering in the evaporator reception. At the same time, it may be possible to omit the provision of an additional tolerance compensator body in the evaporator reception, which keeps the structure of the evaporator assembly comparatively simple. Other additional fixations of the evaporator body in the evaporator reception can also be omitted. The at least one retaining claw can penetrate locally into the evaporator body or at least press against its surface with its part pointing away from the plate-like designed hold-down element, which points towards the inserted evaporator body during assembly of the hold-down element, and thereby exert a fixing force on the evaporator body in the evaporator reception. The exact penetration depth of the at least one retaining claw depends in particular on the actual thickness and density of the evaporator body and the length of the at least one retaining claw, so that insofar the at least one retaining claw can act to compensate for tolerances. An inner diameter of the plate-like designed hold-down element can be between 22 and 68 mm, preferably about 33 mm. An outer diameter of the plate-like designed hold-down element can be between 28 and 80 mm, preferably about 42 mm. A length of the at least one retaining claw can be between 0.5 and 8 mm, preferably between 1 and 6 mm. A length of the at least one retaining claw of between 2 and 4 mm is particularly preferred. The upper part and the lower part of the at least one retaining claw may be placed directly adjacent to each other. Alternatively, the upper part and the lower part may be spaced apart. The upper part and the lower part can be created out of the plane of the remaining hold-down element, for example by twisting a tab, latching a tab or double latching a split tab or alternately embossing an inner edge of the hold-down element.

Usefully it is provided that the plate-like designed hold-down element is connected to the evaporator reception in a substance-bonded manner or is caulked against the evaporator reception. In this way, the evaporator reception, the evaporator body and the hold-down element can be permanently and reliably connected to each other, so that a permanent and reliable correct positioning of the evaporator body in the evaporator reception is achieved, especially during operation of the evaporator assembly and the thermal cycles associated with it. The substance-to-substance bond can be realized by welding or soldering, for example.

Advantageously it is provided that the plate-like designed hold-down element is substantially annular-disk-shaped. In this way, the plate-like designed hold-down element can define the surface of the evaporator body visible towards a combustion chamber, where fuel in gaseous state emerges, for example by the remaining interior of the annular disk. The evaporator assembly itself can be substantially rotationally symmetrical, which keeps the assembly of the evaporator assembly simple, since "twisting" the components to be assembled has no negative effects. If the plate-like designed holding-down element is substantially annular-disk-shaped, it can be designed as either an open or closed annular disk. An open design of the annular disk allows a defined alignment of the hold-down element relative to the evaporator reception, which can be particularly advantageous with regard to the relative position of the at least one holding claw.

It may be provided that the lower part of the at least one retaining claw abuts against the evaporator body in the evaporator reception and/or penetrates into the evaporator body. By the penetration and/or abutting of the lower part of the at least one holding claw with the evaporator body, a reliable permanent fixation of the evaporator body in the evaporator reception is ensured.

Furthermore, it may be provided that the upper part and the lower part have the same shape. In particular, the upper and lower parts can have a point-symmetrical contour with respect to a point of symmetry, so that the hold-down element can be mounted either with the upper side in the direction of the evaporator body or with the lower side in the direction of the evaporator body and the same results are achieved in both cases.

Furthermore, a fuel-operated vehicle heater with such an evaporator assembly is described.

In the following, the present disclosure is described by way of example using preferred embodiments.

Figure 2:
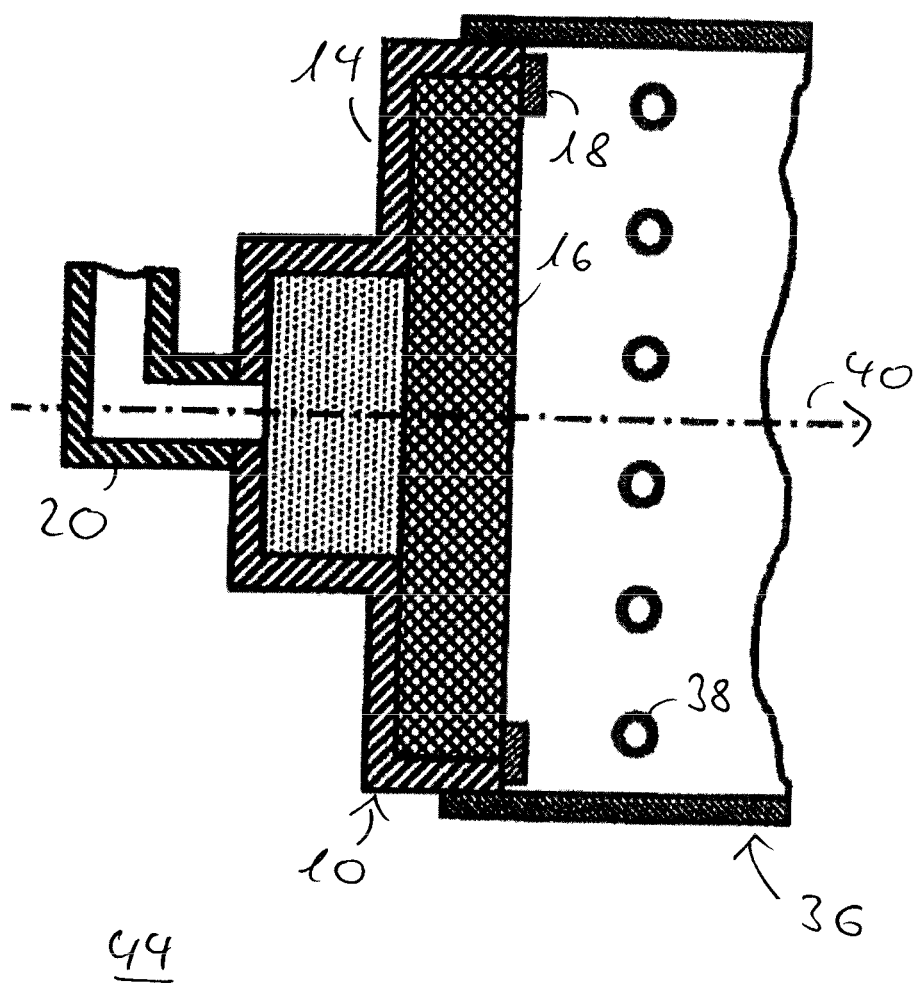
Figure 3:
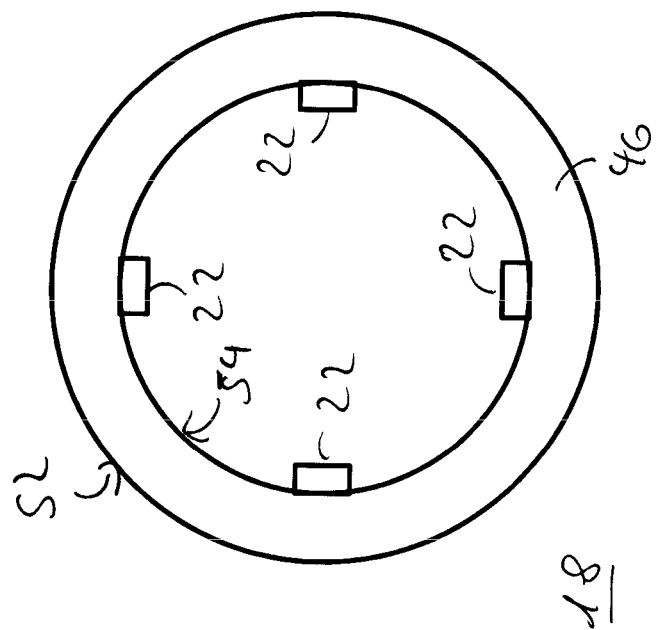
Figure 4:
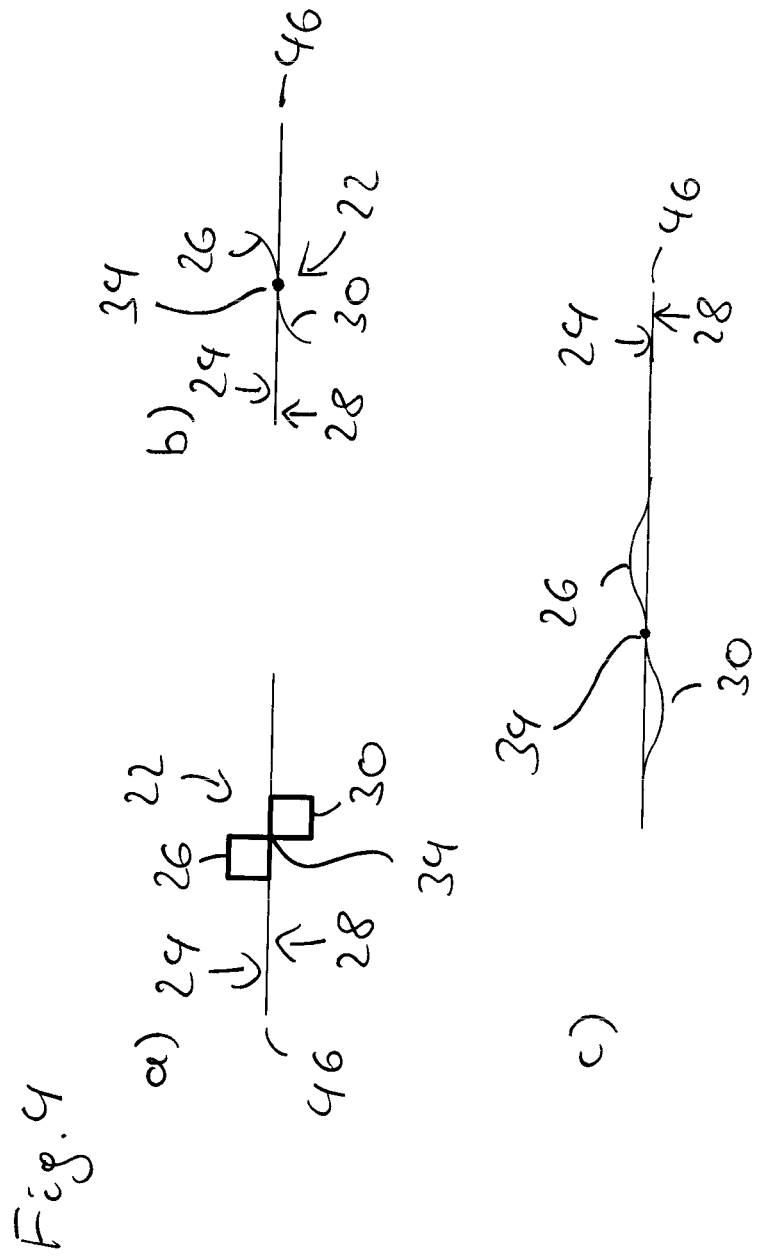
Figure 5:
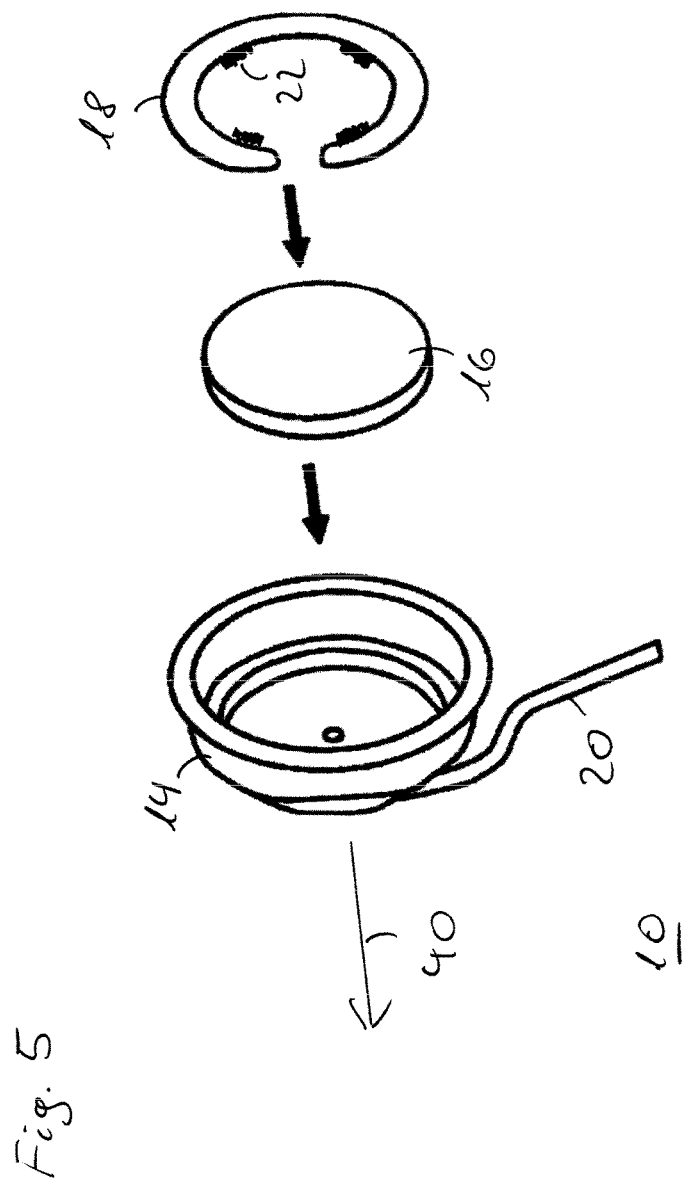
Figure 6:
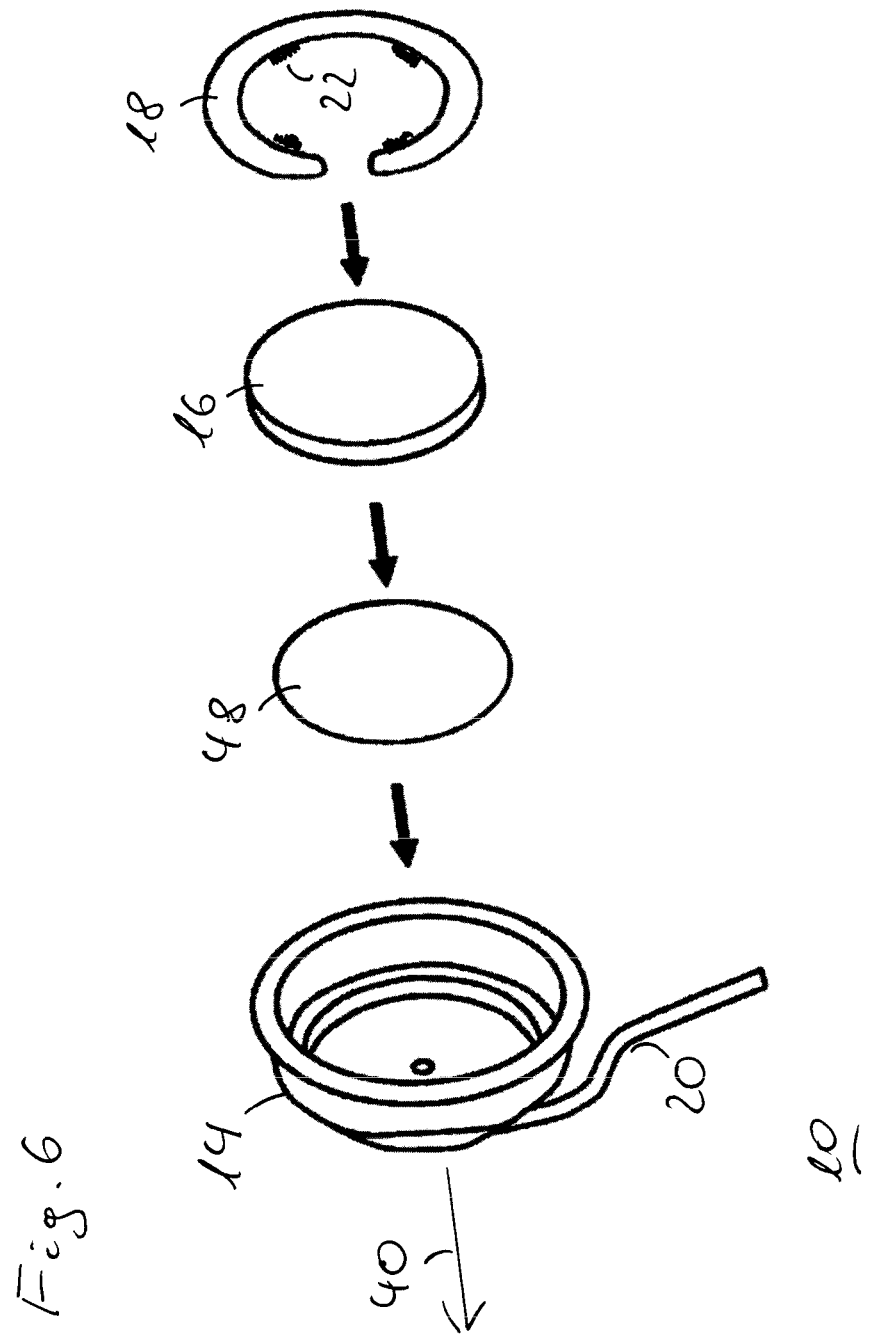
Figure 7:
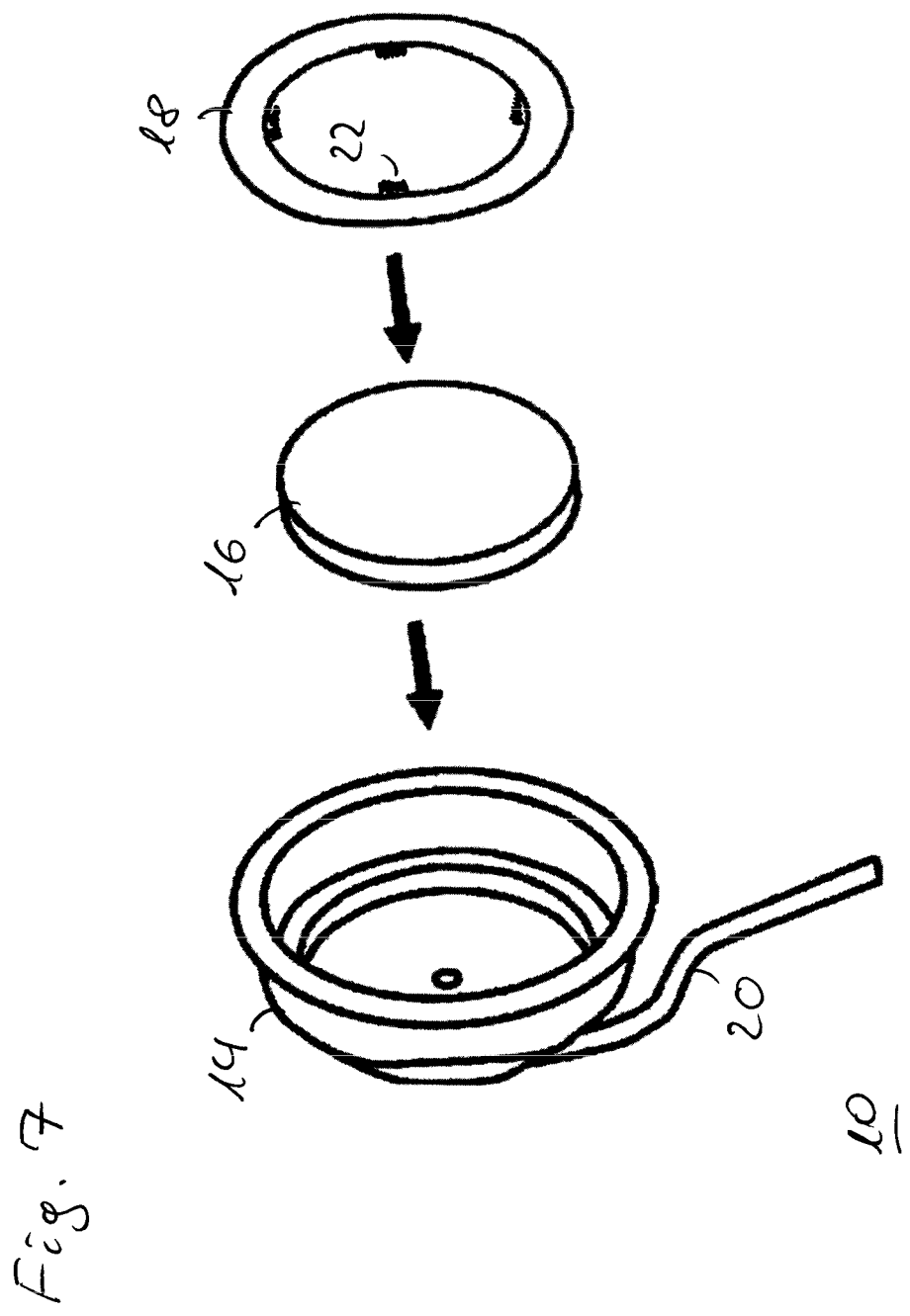

It shows:

FIG. 1 a first lateral sectional view of a burner;

FIG. 2 a second lateral sectional view of a burner;

FIG. 3 a schematic top view of a hold-down element;

FIG. 4a a first lateral sectional view of a hold-down element;

FIG. 4b a second lateral sectional view of a hold-down element;

FIG. 4c a third lateral sectional view of a hold-down element;

FIG. 5 a first three-dimensional exploded view of an evaporator assembly;

FIG. 6 a second three-dimensional exploded view of an evaporator assembly;

FIG. 7 a third three-dimensional exploded view of an evaporator assembly; and

Figure 8:
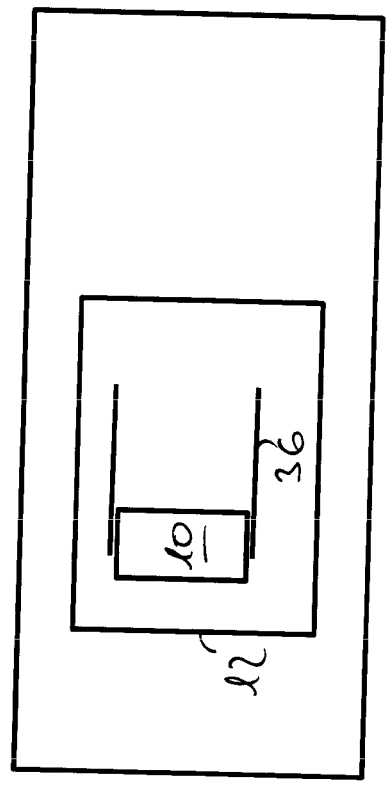

FIG. 8 a schematic diagram of a vehicle with a vehicle heater.

In the following Figures, identical reference numerals indicate identical or similar parts.

FIG. 1 shows a first lateral sectional view of a burner 44. The burner 44 comprises an evaporator assembly 10 to which a combustion tube 36 is attached so that the burner 44 extends essentially along the axial direction 40. The combustion tube 36 has air passages 38 where combustion air passes into the area directly above the evaporator assembly 10 and mixes with the fuel evaporated there. The combustion tube 36 completely surrounds the evaporator assembly 10 in a radial direction 42 perpendicular to the axial direction 40. Evaporator assembly 10 comprises a pot-like evaporator reception 14 in which an evaporator body 16 is inserted. At a bottom of the pot-like evaporator reception there is an opening through which fuel can enter into the evaporator body 16 through the fuel feed 20 provided at the opening. The evaporator body 16 is fixed in the evaporator reception 14 by means of a hold-down element 18. The hold-down element 18 extends in the radial direction 42 from the outer edge of the evaporator reception 14 towards its center and is essentially plate-shaped. The hold-down element 18 can, for example, be soldered or welded to the upper edge of the evaporator reception 14. The hold-down element 18 can, for example, be designed annular.

FIG. 2 shows a second lateral sectional view of a burner 44. The burner 44 shown in FIG. 2 differs from the burner 44 previously described in FIG. 1 in particular by the modified evaporator assembly 10, which is step-like in FIG. 2 and forms a "dome" in the region of the fuel feed 20 in the evaporator reception 14 so that the evaporator body 16 is thicker in the axial direction 40 in the inlet region of the fuel. The evaporator body 16 can also be constructed from a variety of different materials. For example, the evaporator body 16 can be made of two different materials, as shown in FIG. 2. In the region of the "dome" near the fuel feed 20, for example, there may be less porosity than in the more distant region of the evaporator body 16, which is openly adjacent to the combustion tube 36.

FIG. 3 shows a schematic top view of a hold-down element 18. The hold-down element 18 shown in FIG. 3 is in particular designed annular and has an outer edge 52 and an inner edge 54. When mounted, the outer edge 52 can be soldered, welded or caulked to the evaporator reception. The inner edge 54 may have at least one retaining claw 22, wherein FIG. 3 indicates four retaining claws 22 evenly distributed over the inner edge. However, there may also be more or less retaining claws 22 evenly distributed along the inner edge 54. A ring 46 which essentially forms the hold-down element 18 may be produced together with the retaining claws 22, for example by a simple punching from a metal sheet.

FIG. 4a shows a first lateral sectional view of a hold-down element 18. In the case of the hold-down element 18 shown in FIG. 4a, the ring 46 is visible as a thin line in lateral view. The ring has an upper side 24 and a lower side 28. The shown retaining claw 22 comprises two projections, which can be designed as rectangular tabs, for example. An upper part 26 of the holding claw 22 can be positioned towards the upper side 24. A lower part 30 of the holding claw 22 can be positioned towards the lower side 28. For example, the upper part 26 and the lower part 30, or the contour of the two parts 26, 30 can be point-symmetrical to a symmetry point 34, so that the upper side 24 and the lower side 28 of the hold-down element 18 cannot be distinguished from each other. The upper part 26 and the lower part 30 can also have different lengths. The variant of the retaining claw 22 shown in FIG. 4a can, for example, be produced by latching the tabs. The two parts 26, 30 can be placed directly next to each other or spaced apart.

FIG. 4b shows a second lateral sectional view of the hold-down element 18. In the case of the hold-down element 18 shown in FIG. 4b, for example, the recognizable wing-like contour of the holding claw 22 consists of a single tab, the opposite ends of which are bent up in the direction of the upper side 24 and the lower side 28, so that even in the case shown in FIG. 4b, the holding element 22 or the contour of the holding element 22 may have a point symmetry with respect to the symmetry point and an upper part 26 and a lower part 30 of the retaining claw are recognizable. The variant of the retaining claw 22 shown in FIG. 4b can be created, for example, by turning the tabs. It is also conceivable to bend only one side of a tab so that the upper part 26 is, for example, on a different tab than the lower part 30. The two parts 26, 30 can lie directly next to each other or be spaced apart.

FIG. 4c shows a third lateral sectional view of a hold-down element 18. In the third possibility for the design of retaining claws 22 shown in FIG. 4c, the inner edge 54 shown in FIG. 3 is simply curved alternately upwards and downwards towards the top 24 and the bottom 28 by embossing. Here, too, a certain symmetry is created in relation to a symmetry point 34.

FIG. 5 shows a first three-dimensional exploded view of an evaporator assembly 10. To start with, in the case of evaporator assembly 10 shown in FIG. 5, the pot-like evaporator reception 14 is visible on the left side. At a bottom of this evaporator reception 14 an opening is visible through which the fuel flowing through the fuel supply 20 can enter the evaporator reception 14 during operation. The evaporator body 16 is initially inserted into the evaporator reception 14 in the axial direction 40. Then the evaporator body 16 can be fixed in the evaporator reception with the aid of the hold-down element 18, which has several retaining claws 22. For this purpose, the hold-down element 18 is also placed in the axial direction 40 on the evaporator reception 14 and the evaporator body 16 so that at least the retaining claws 22 rest against the evaporator body 16 or even partially penetrate it. Subsequently, the hold-down element 18 can be soldered, circumferentially welded or caulked to the evaporator reception 14, for example. The opening in the annular-like hold-down element 18 can be used for the targeted relative alignment of the hold-down element 18 with respect to the evaporator reception 14.

FIG. 6 shows a second three-dimensional exploded view of an evaporator assembly 10. The evaporator assembly 10 shown in FIG. 6 differs from the evaporator assembly 10 already known from FIG. 2 by an additional tolerance compensating element 48 which is inserted into the evaporator reception 14 below the evaporator body 16 and is intended in particular to ensure that the evaporator body 16 does not lift off the bottom of the evaporator reception 14 when mounted, since such gaps can prevent the formation of a uniform fuel-air mixture.

FIG. 7 shows a third three-dimensional exploded view of an evaporator assembly 10. The evaporator assembly 10 shown in FIG. 7 differs from the evaporator assembly 10 already known from FIG. 5, in particular in that the hold-down element 18 forms a closed ring, while the hold-down element 18 shown in FIG. 5 is an open ring.

FIG. 8 shows a schematic diagram of a vehicle with a vehicle heater. The vehicle 50 shown in FIG. 8 comprises a vehicle heater 12 with an evaporator assembly 10 on which a combustion tube 36 is mounted. Fuel vaporized by the evaporator assembly 10 flows together with combustion air into the combustion tube 36 and is burned there under heat development. The resulting heat can be used, for example, to heat a fluid flow which in turn heats up a vehicle interior, for example.

The features of the disclosure disclosed in the above description, drawings and claims may be essential for the realization either individually or in any combination.

REFERENCE NUMERALS 10 evaporator assembly
12 vehicle heater
14 evaporator reception
16 evaporator body
18 hold-down element
20 fuel feed
22 retaining claw
24 upper side
26 upper part
28 lower side
30 lower part
34 symmetry point
36 combustion tube
38 air passages
40 axial direction
42 radial direction
44 burner
46 ring
48 tolerance compensating element
50 vehicle
52 outer edge
54 inner edge

The invention claimed is:

1. Evaporator assembly for a fuel-operated vehicle heater, comprising
    a pot-like evaporator reception,
    an evaporator body inserted into the pot-like evaporator reception,
    a plate-like designed hold-down element, which is fixed to the evaporator reception and fixes the evaporator body in the evaporator reception, and
    wherein the plate-like designed hold-down element has at least one retaining claw, which has an upper part on an upper side of the plate-like designed hold-down element and a lower part on a lower side of the plate-like designed hold-down element,
    wherein the upper part and the lower part point away from the plate-like designed hold-down element.

2. Evaporator assembly according to claim 1, wherein the plate-like designed hold-down element is connected to the evaporator reception in a substance-bonded manner or is caulked against the evaporator reception.

3. Evaporator assembly according to claim 1, wherein the plate-like designed hold-down element is substantially annular-disk-like.

4. Evaporator assembly according to claim 1, wherein the lower part of the at least one retaining claw abuts against the evaporator body in the evaporator reception and/or penetrates into the evaporator body.

5. Evaporator assembly according to claim 1, wherein the upper part and the lower part (30) have the same shape.

6. Fuel-operated vehicle heater having an evaporator assembly according to claim 1.

* * * * *